United States Patent
Buer

[19]

[11] Patent Number: 6,101,605
[45] Date of Patent: Aug. 8, 2000

[54] METHOD AND APPARATUS FOR PERFORMING A SECURE OPERATION

[75] Inventor: Mark Leonard Buer, Chandler, Ariz.

[73] Assignee: VLSI Technology, Inc., San Jose, Calif.

[21] Appl. No.: 08/857,477

[22] Filed: May 15, 1997

[51] Int. Cl.[7] .................................................. H04K 1/00
[52] U.S. Cl. ................................... 713/189; 713/200
[58] Field of Search ................................. 713/200, 193, 713/189; 380/4, 3, 59

[56] References Cited

U.S. PATENT DOCUMENTS

| | | | |
|---|---|---|---|
| 5,452,355 | 9/1995 | Coli | 380/4 |
| 5,481,672 | 1/1996 | Okuno et al. | 395/188.01 |
| 5,825,875 | 10/1998 | Ugon | 380/4 |

*Primary Examiner*—Tod R. Swann
*Assistant Examiner*—Trevor Quick Coddington
*Attorney, Agent, or Firm*—Douglas L. Weller

[57] ABSTRACT

To perform a secure operation, an original encrypted value is obtained from a memory. The original encrypted value is decrypted to obtain an original value and an original validity code. The original validity code is compared with a stored validity code. If the original validity code is equivalent to the stored validity code, the secure operation is performed on the original value to produce a new value. Then a permanent alteration is made to the stored validity code to produce a new stored validity code. The new value and the new stored validity code are encrypted to produce a new encrypted value. The new encrypted value is stored in the memory.

17 Claims, 4 Drawing Sheets

METHOD AND APPARATUS FOR PERFORMING A SECURE OPERATION

BACKGROUND

The present invention concerns security protection within a secure device and pertains particularly to a method and apparatus for performing a secure operation.

In order to protect against theft or misuse, security devices are utilized to protect property. The property can be tangible or intangible. An example of intangible property that often requires protection is information stored within an integrated circuit memory.

One solution is to include security features on the integrated circuit upon which the information is stored. In this way, the information may be encrypted and access to the encrypted information can be limited.

For some applications, however, implementation of a security system on a single integrated circuit may not be feasible. For example, a security system may be implemented using two integrated circuits. A first integrated circuit is a security device and a second integrated circuit is a non-volatile memory such as an erasable programmable read-only memory (EPROM) or a flash memory.

The security device encrypts information using a security key, unique to the security device, before storing the information on the non-volatile memory. This protects the information from being read by other devices.

One problem with this approach is that there can be susceptibility to a "replay" attack. In a replay attack the data stored in the non-volatile memory is copied. Later the copied data can be used to restore the information within the non-volatile memory to a previous value.

For example, suppose the security system is used to keep track of an amount of money. Further, suppose the security system initially has $50 to spend in an "off-line" system. If the security system is implemented using two integrated circuits, the security device encrypts the amount "$50" using a security key and places the encoded value in the non-volatile memory. Without the security key, the encrypted amount is safe from decryption. Further, without the security key it would be extremely difficult to replace the encrypted amount of $50 with another valid dollar amount.

However, now suppose that the contents of the non-volatile memory is copied. This copy of the contents includes the encrypted amount of $50. The $50 now may be spent by the user of the security system. After all the money has been spent, the security device encrypts the amount "$0" using the security key and places the encoded value in the non-volatile memory. However, the copy of the contents the non-volatile memory can now be copied back to the non-volatile memory and replace the current contents. Since the copy of the contents was made when the encrypted amount was $50, the copy back from the previous contents of the non-volatile memory results in restoration of the encrypted amount to $50. Thus, when the replacement of the contents of the non-volatile memory is not detectable to the security device, it can allow the security system to be circumvented.

SUMMARY OF THE INVENTION

In accordance with the preferred embodiment of the present invention, a secure operation is performed. An original encrypted value is obtained from a memory. The original encrypted value is decrypted to obtain an original value and an original validity code. The original validity code is compared with a stored validity code. If the original validity code is equivalent to the stored validity code, the secure operation is performed on the original value to produce a new value. Then a permanent alteration is made to the stored validity code to produce a new stored validity code. The new value and the new stored validity code are encrypted to produce a new encrypted value. The new encrypted value is stored in the memory.

In the preferred embodiment, the stored validity code is stored in a one-time programmable memory. The permanent alteration to the stored validity code includes permanently programming a bit within the one-time programmable memory.

Also in the preferred embodiment, a security key is used for encryption and decryption. The security key is also stored in the one-time programmable memory.

The present invention is particularly useful where the security device is located on a first integrated circuit, the memory is located on a separate integrated circuit. The one-time programmable memory is within the security device on the first integrated circuit.

The present invention provides for implementation of a security system which can use an external memory element and still be secure from a replay attack. The use of a one-time programmable memory in the preferred embodiment of the present invention makes it very difficult to read, write or copy the validity code using an external probe. Also the use of a one-time programmable memory in the preferred embodiment of the present invention obviates the need for a battery.

DESCRIPTION OF THE PREFERRED EMBODIMENT

Figure 1:
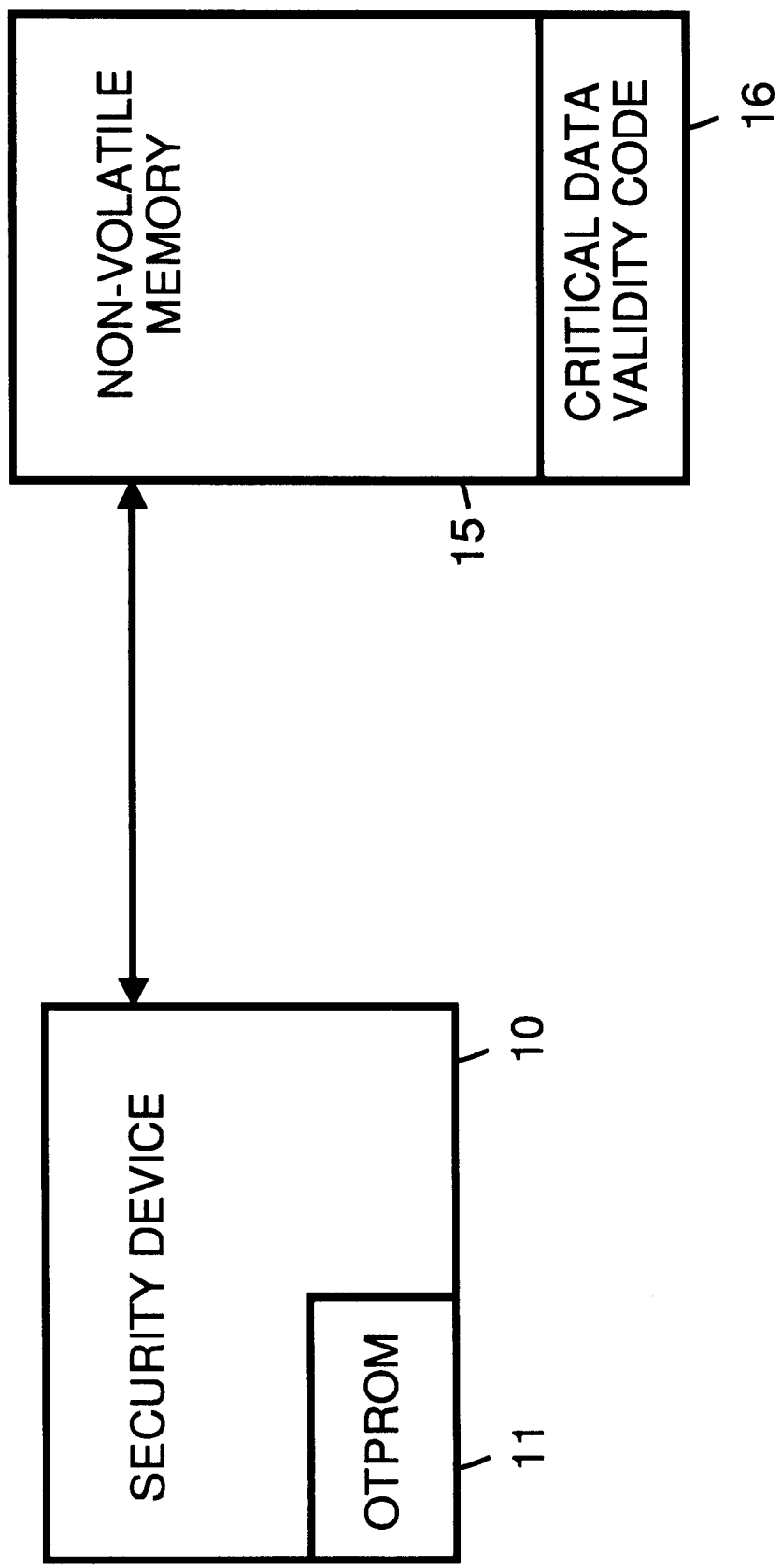
FIG. 1 shows a security system, located on two integrated circuits, which includes a security device and a non-volatile memory in accordance with a preferred embodiment of the present invention.

FIG. 1 shows a security system which includes a security device 10 and a non-volatile memory 15. For example, non-volatile memory 15 consists of erasable programmable read-only memory (EPROM) or FLASH memory. A critical data and validity code portion 16 of non-volatile memory is used to store critical data which is encrypted along with a validity code. Security device 10 and non-volatile memory 15 may be located on the same or on different integrated circuits.

Security device 10 encrypts the data using a security key. The security and the validity code are both stored in a one-time programmable read-only memory (OTPROM) 11 within security device 10.

Figure 2:
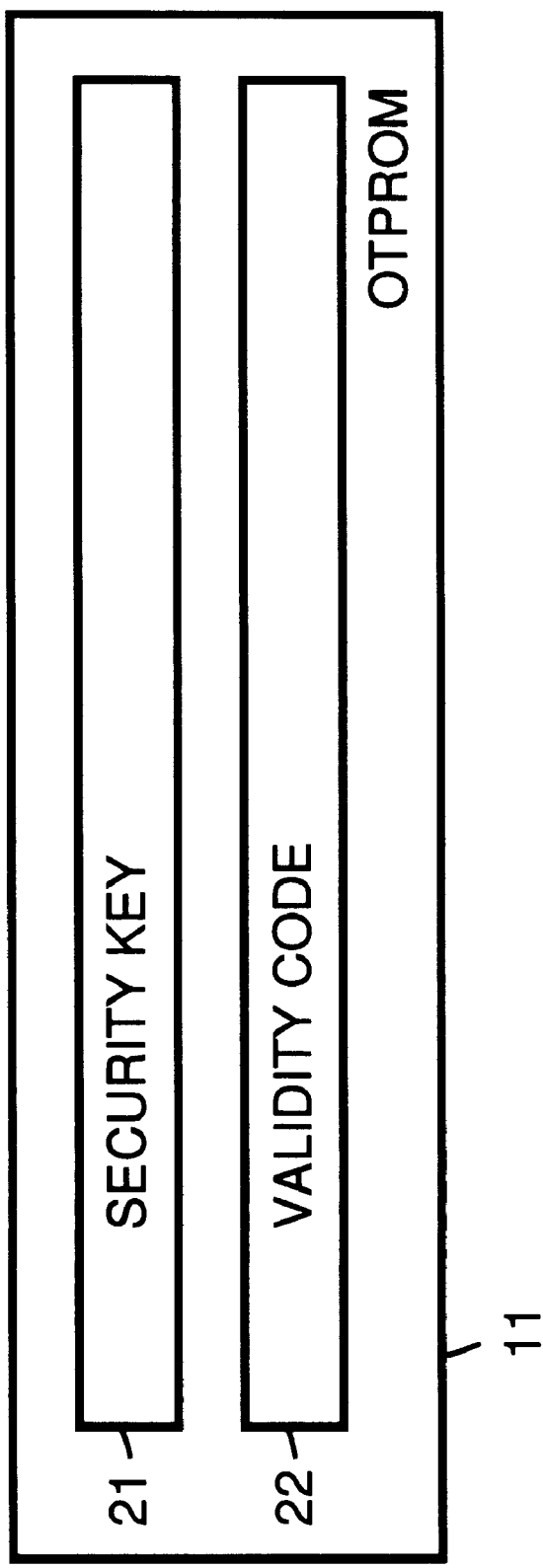
FIG. 2 shows a one-time programmable memory including a security key and a separate validity code in accordance with a preferred embodiment of the present invention.

FIG. 2 shows OTPROM 11 as storing both a security key 21 and a validity code array 22. OTPROM 11 may be located in one location or on security device or in order to protection against probing, divided into several portions which are scattered over security device 10.

Security key 21 is programmed before security device 10 is put into use. After being programmed, security key 21 does not change. Security key 21 is unique to security device 10 and allows security device to encrypt and decrypt information stored in critical data and validity code portion 16 of non-volatile memory 15. The value of security key 21 is protected so that it is difficult for an attacker to discover it.

Validity code array 22 is not programmed when security device 10 is first put into service. However, each time security device 10 stores data into critical data and validity code portion 16 of non-volatile memory 15, security device 10 programs one or more bits of validity code array 22, encrypts the resulting validity code along with the data using security key 21, and then stores the encrypted data and validity code in critical data and validity code portion 16 of non-volatile memory 15.

Figure 3:
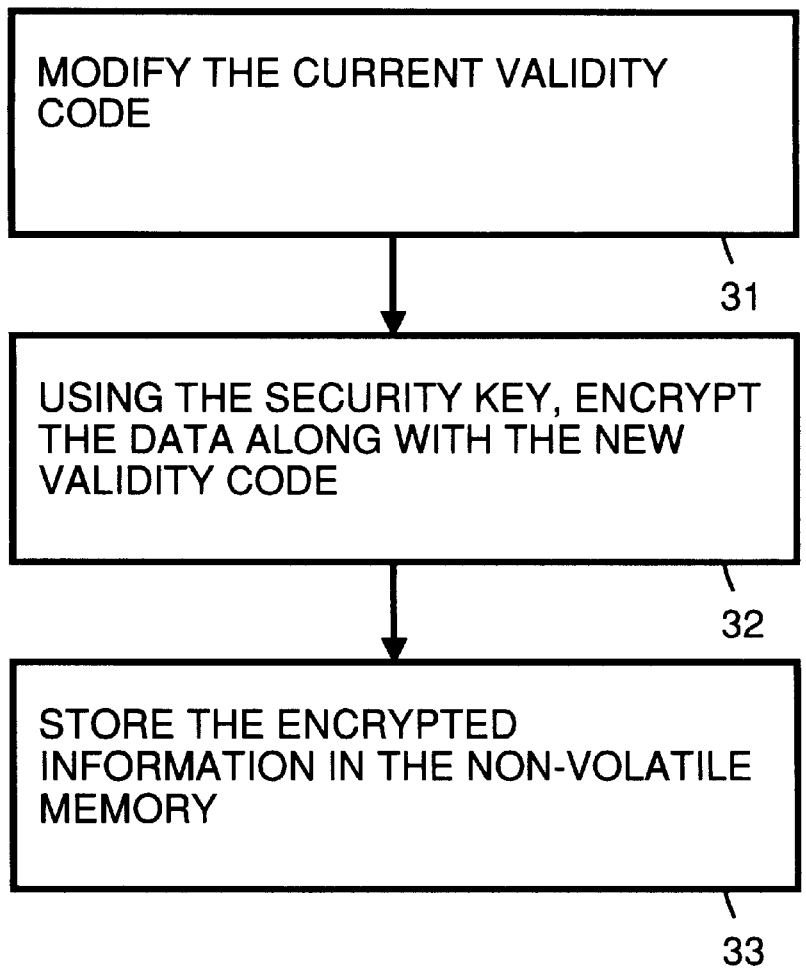
FIG. 3 is a flowchart which illustrates secure storage of information using a security key and a separate validity code in accordance with a preferred embodiment of the present invention.

FIG. 3 is a flowchart which illustrates secure storage of secure data using security key 21 and validity code array 22. In a step 31, the current validity code value in validity code array 22 is modified by programming one or more bits. The bits within validity code array 22 can be modified sequentially each time there is secure storage of information using security key 21 and validity code array 22. Alternatively, the bits within validity code array 22 can be modified in a random or pseudo-random order each time there is secure storage of information using security key 21 and validity code array 22. When all the bits within validity code array 22 have been programmed, secure device 10 will not store any more information within critical data and validity code portion 16 of non-volatile memory 15 and is effectively disabled.

In a step 32, security device 10 utilizes storage key 21 to encrypt the secure data along with the modified validity code value in validity code array 22 to generate encrypted data and validity code value. In a step 33, the encrypted data and validity code value are stored in critical data and validity code portion 16 of non-volatile memory 15.

Each bit of validity code array 22 can be programmed only once, after which the programmed bit remains programmed. Therefore, there must be enough bits within validity code array 22 to allow for the projected number of times security device 10 will be used to store encrypted information into critical data and validity code portion 16 of non-volatile memory 15 over the useful life of security device 10. Once all the bits within validity code array 22 have been programmed, security device 10 should be discarded.

Figure 4:
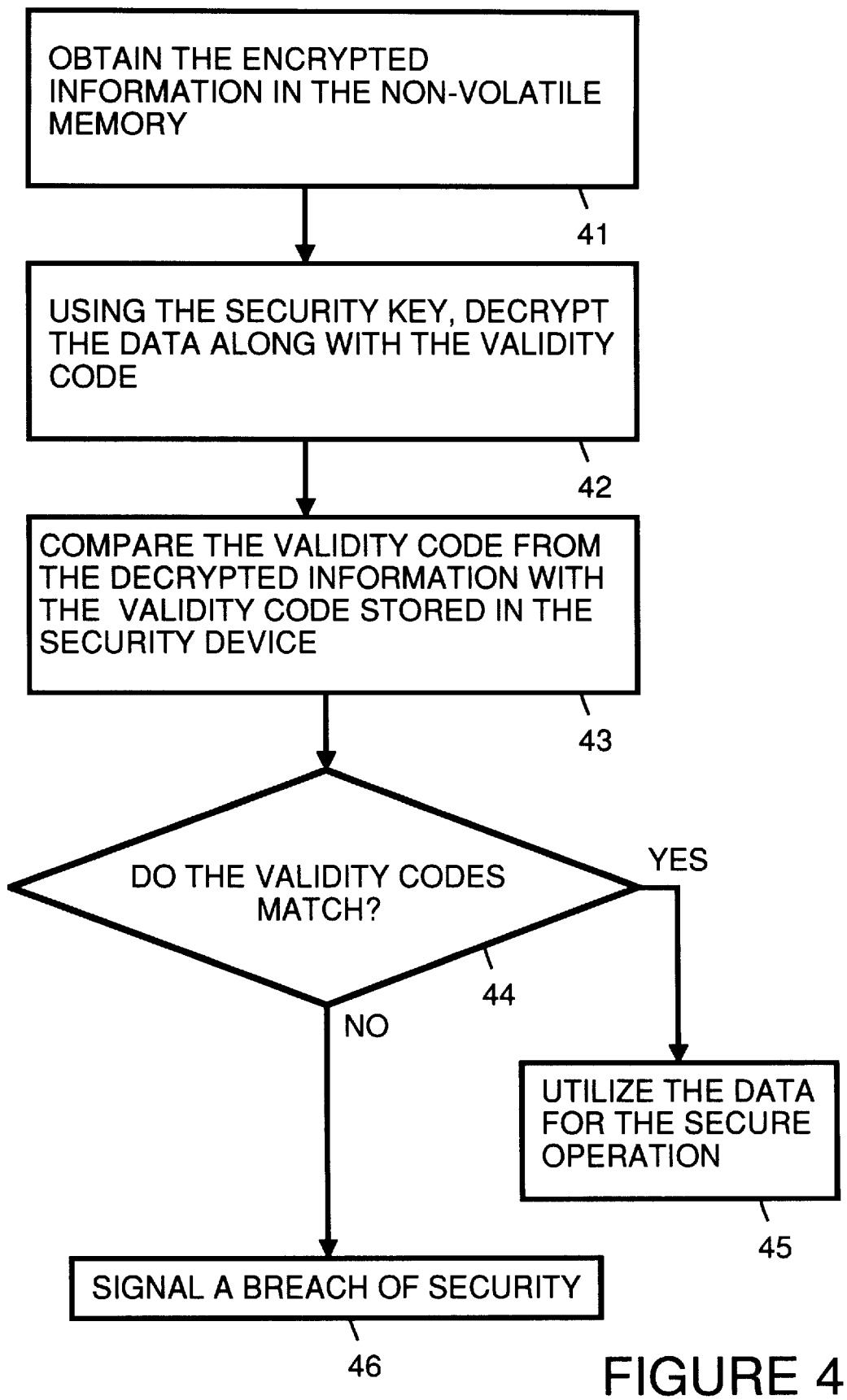
FIG. 4 is a flowchart which illustrates secure accessing of information which was stored using a security key and a separate validity code in accordance with a preferred embodiment of the present invention.

FIG. 4 is a flowchart which illustrates secure accessing of encrypted information which was stored using security key 12 and the validity code value stored within validity code array 22. In a step 41, the encrypted data and validity code are obtained from critical data and validity code portion 16 of non-volatile memory 15. In a step 42, the encrypted data and validity code are decrypted using security key 21.

In a step 43, the validity code decrypted in step 42 is compared with the validity code value stored in validity code array 22. If in a step 44 it is determined that the validity code decrypted in step 42 matches the validity code value stored in validity code array 22, in a step 45, the data may be utilized by security device 10.

If in step 44 it is determined that the validity code decrypted in step 42 does not match the validity code value stored in validity code array 22, in a step 46, this results in signaling that a breach of security has occurred. This results, for example, in the decrypted data being discarded and/or security device 10 disabling itself. For example, security device 10 disables itself by programming all remaining unprogrammed bits in validity code array 22.

It can be seen that the present invention prevents a successful replay attack. For example, again suppose the security system is used to keep track of an amount of money. Further, suppose the security system initially has $50 to spend in an "off-line" system. Security device 10 permanently programs at least one bit in validity code array 22 and encrypts the amount "$50" along with the current validity code value in validity code array 22 using security key 21. The encrypted value is stored in critical data and validity code portion 16 of non-volatile memory 15. Without security key 21, the encrypted amount is safe from decryption. Further, without security key 21 it would be extremely difficult to replace the encrypted amount of $50 with another valid dollar amount.

Now suppose that the contents of the non-volatile memory is copied. This copy of the contents includes the encrypted amount of $50 and the validity code. The $50 now is spent by the user of the security system. Each time security device 11 stores a new dollar amount in validity code portion 16 of non-volatile memory 15, security device 11 programs at least one additional bit in validity code array 22. After all the money has been spent, security device 10 encrypts the amount "$0" along with a current validity code using security key 21 and places the encoded value in validity code portion 16 of non-volatile memory 15. Suppose the copy of the contents of validity code portion 16 of non-volatile memory 15 are copied back to the nonvolatile memory to replace the current contents. The copy of the contents was made when the encrypted amount was $50, however the $50 was encoded with a stale validity code. When security device 10 decrypts the value stored in validity code portion 16 of non-volatile memory 15 and checks the decrypted validity code, security device will detect that the decrypted validity code is stale. This prevents the security system from being circumvented via a replay attack.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for performing a secure operation comprising the following steps:
   (a) obtaining an original encrypted value from a memory;
   (b) decrypting the original encrypted value to obtain an original value and an original validity code;
   (c) comparing the original validity code with a stored validity code; and,
   (d) if the original validity code is equivalent to the stored validity code, performing the following substeps:
      (d.1) performing the secure operation on the original value to produce a new value,
      (d.2) making a permanent alteration to the stored validity code to produce a new stored validity code,
      (d.3) encrypting the new value and the new stored validity code to produce a new encrypted value, and
      (d.4) storing the new encrypted value in the memory.

2. A method as in claim 1 wherein the stored validity code is stored in a one-time programmable memory and the permanent alteration to the stored validity code in substep (d.2) includes permanently programming a bit within the one-time programmable memory.

3. A method as in claim 1 wherein the stored validity code is stored in a one-time programmable memory.

4. A method as in claim 3 wherein step (b) includes using a security key to decrypt the encrypted data, the security key also being stored in the one-time programmable memory.

5. A method as in claim 1 wherein the method is performed by a security device which is located on a first integrated circuit, the memory being located on a second integrated circuit.

6. A method as in claim 1 wherein step (b) includes using a security key to decrypt the encrypted data and substep (d.3) includes using the security key to encrypt the new value and the new stored validity code.

7. A method for performing a secure operation comprising the following steps:
   (a) obtaining encrypted data from a memory, the encrypted data including an original value and an original validity code which have been encrypted, wherein the original validity code is independent of and is not derived from any portion of the original value;
   (b) decrypting the encrypted data to obtain the original value and the original validity code;
   (c) comparing the original validity code with a stored validity code; and,
   (d) if the original validity code is equivalent to the stored validity code, performing the secure operation on the original value to produce a new value.

8. A method as in claim 7 wherein the stored validity code is stored in a one-time programmable memory.

9. A method as in claim 8 wherein step (b) includes using a security key to decrypt the encrypted data, the security key also being stored in the one-time programmable memory.

10. A method as in claim 7 wherein the method is performed by a security device which is located on a first integrated circuit, the memory being located on a second integrated circuit.

11. A method as in claim 7 wherein step (b) includes using a security key to decrypt the encrypted data.

12. A method for performing a secure operation comprising the following steps:
    (a) obtaining encrypted data from a memory, the encrypted data including an original value and an original validity code which have been encrypted;
    (b) decrypting the encrypted data to obtain the original value and the original validity code;
    (c) comparing the original validity code with a stored validity code; and,
    (d) if the original validity code is equivalent to the stored validity code, performing the following substeps:
        (d.1) performing the secure operation on the original value to produce a new value,
        (d.2) making a permanent alteration to the stored validity code to produce a new stored validity code,
        (d.3) encrypting the new value and the new stored validity code to produce a new encrypted value, and
        (d.4) storing the new encrypted value in the memory;

wherein the stored validity code is stored in a one-time programmable memory and the permanent alteration to the stored validity code in substep (d.2) includes permanently programming a bit within the one-time programmable memory.

13. A security system comprising:
    a memory, the memory storing encrypted data; and
    a security device, the security device including a one-time programmable memory in which is stored a stored validity code, wherein in order to perform a secure operation the security device obtains the encrypted data from the memory, the encrypted data including an original value and an original validity code which have been encrypted, the security device decrypts the encrypted data to obtain the original value and the original validity code, the security device compares the original validity code with the stored validity code, and if the original validity code is equivalent to the stored validity code, the security device performs the secure operation on the original value to produce a new value, and wherein the original validity code is independent of and is not derived from any portion of the original value.

14. A security system as in claim 1 wherein the security device makes the permanent alteration to the stored validity code by permanently programming at least one bit within the one-time programmable memory.

15. A security system as in claim 13 wherein the one-time programmable memory also stores a security key, the security key being used by the security device to decrypt the encrypted data.

16. A security system as in claim 13 wherein the security device which is located on a first integrated circuit and the memory is located on a second integrated circuit.

17. A security system comprising:
    a memory the memory storing encrypted data; and
    a security device, the security device including a one-time programmable memory in which is stored a stored validity code wherein in order to perform a secure operation the security device obtains the encrypted data from the memory, the encrypted data including an original value and an original validity code which have been encrypted, the security device decrypts the encrypted data to obtain the original value and the original validity code. the security device compares the original validity code with the stored validity code. and if the original validity code is equivalent to the stored validity code the security device performs the secure operation on the original value to produce a new value;
    wherein to store a new encrypted value in the memory, the security device, after performing the secure operation on the original value to produce a new value, makes a permanent alteration to the stored validity code to produce a new stored validity code, the security device encrypts the new value and the new stored validity code to produce the new encrypted value, and the security device stores the new encrypted value in the memory.

* * * * *